(12) United States Patent
Kogure et al.

(10) Patent No.: US 7,782,557 B2
(45) Date of Patent: Aug. 24, 2010

(54) LENS POSITION ADJUSTING DEVICE

(75) Inventors: Yuji Kogure, Saitama (JP); Toshiyuki Irie, Saitama (JP)

(73) Assignee: Hoya Corporation, Tokyo (JP)

( * ) Notice: Subject to any disclaimer, the term of this patent is extended or adjusted under 35 U.S.C. 154(b) by 155 days.

(21) Appl. No.: 11/766,263

(22) Filed: Jun. 21, 2007

(65) Prior Publication Data
US 2007/0297785 A1 Dec. 27, 2007

(30) Foreign Application Priority Data
Jun. 23, 2006 (JP) ............................. 2006-173421

(51) Int. Cl.
G02B 7/02 (2006.01)
G02B 15/14 (2006.01)

(52) U.S. Cl. ...................... 359/822; 359/829; 359/701; 359/823

(58) Field of Classification Search ................ 359/817, 359/811, 819–830, 699–704; 396/72; 353/100, 353/101; G02B 7/02, 7/04
See application file for complete search history.

(56) References Cited

U.S. PATENT DOCUMENTS 5,376,983 A * 12/1994 Yamazaki et al. ............. 396/72
5,587,843 A * 12/1996 Chen .......................... 359/700
6,154,255 A * 11/2000 Shishido et al. ............. 348/375
6,364,491 B1 * 4/2002 Okada et al. ................ 353/101
7,403,348 B2 * 7/2008 Kuroda et al. ............... 359/823
2001/0019398 A1 * 9/2001 Agata ......................... 353/100

FOREIGN PATENT DOCUMENTS

JP 2002-62466 2/2002

OTHER PUBLICATIONS

U.S. Appl. No. 11/766,211 to Kogure, which was filed on Jun. 21, 2007.
English language Abstract of JP 2002-62466.

* cited by examiner

Primary Examiner—Darryl J Collins
Assistant Examiner—Zachary Wilkes
(74) Attorney, Agent, or Firm—Greenblum & Bernstein P.L.C.

(57) ABSTRACT

A lens position adjusting device of a lens barrel includes a stationary ring, and a manual rotating ring which is screw-engaged with the stationary ring to be manually rotatable about an optical axis to move a movable lens group in the optical axis direction, wherein the manual rotating ring includes an operating ring member; and a sub-ring member which is screwed into the stationary ring, wherein the operating ring member and the sub-ring member are coupled to each other so that a relative rotation position therebetween about the optical axis is adjustable.

17 Claims, 5 Drawing Sheets

Ls : Movement Amount via 1 Adjustment Shim
Lx : Movement Amount via Adjusting Screws

LENS POSITION ADJUSTING DEVICE

BACKGROUND OF THE INVENTION

1. Field of the Invention

The present invention relates to a lens adjusting device for a camera, and more specifically relates to a lens position adjusting device provided in a lens barrel for camera in which a lens group moves in an optical axis direction by a rotation of a manual operating ring provided on the lens barrel, wherein the lens adjusting device is configured to be capable of adjusting the position of the lens group in the optical axis direction with respect to the rotation position of the manual operating ring.

2. Description of the Related Art

A photographic lens barrel of a camera which is provided on a lens barrel with a focus ring (manual operating ring) and a zoom ring (manual operating ring) that are operated by the user to change the position of one or more movable lens groups provided in the lens barrel in an optical axis direction to thereby adjust the focus and the focal length of the photographic lens, respectively, is known in the art. Various mechanisms for changing the position of one or more movable lens groups by a rotation of the focus ring or the zoom ring have been proposed. Among such mechanisms, a mechanism wherein a cam ring provided in a lens barrel rotates via a rotation of a manual operating ring, and a lens frame which supports a lens group is provided integrally with a set of cam rollers (cam followers) which are respectively engaged in a set of cam grooves formed in a cam ring to convert rotational movements of the cam ring into linear movements of the set of cam rollers, i.e., linear movements of the lens group supported by the lens frame, is known in the art.

In the lens barrel having such a mechanism, it is necessary to perform an adjusting operation for precisely matching a position of the movable lens group in the optical axis direction with a corresponding rotation position of the manual operating ring. For instance, in a focus adjustment operation, upon the focus ring being turned to a specific one of a plurality of markings of the distance scale formed on the lens barrel, the movable lens group is adjusted so as to be moved to the corresponding position in the optical axis direction that corresponds to the distance represented by the specific one marking. A technique of adjusting the distance between the focus ring and a focus cam ring in the optical axis direction is known in the art as a technique of performing a focus adjustment operation for adjusting the rotation position of the focus ring and the position of the movable lens group in such a manner to correspond to each other. Namely, if the position of the focus cam ring relative to the focus ring in the optical axis direction is changed, the position of the focus cam ring in the optical axis direction varies even when the focus ring is rotated to the same rotation position thereof. To perform this adjusting operation, it is conventionally the case that one or more adjustment shims, each having a required thickness in the optical axis direction, is installed at the joint between the focus ring and the focus cam ring to be interposed therebetween so that the relative position between the focus ring and the focus cam ring can be adjusted by changing the number of the adjustment shims interposed therebetween. For instance, a conventional adjusting method for adjusting focus of a lens by installing one or more washers (which operate just like the adjustment shims) into a lens system is disclosed in Japanese Unexamined Patent Publication No. 2002-62466.

In the technique of adjusting a lens position by adjusting the relative position between two members in the optical axis direction using such adjusting shims, the amount of focus adjustment is limited to the thickness of one adjustment shim, or limited to the total thickness of adjustment shims in the case of using more than one adjustment shim. In either of these two cases, the amount of focus adjustment can only be varied stepwise. Additionally, when a plurality of adjustment shims are selectively used, the stepwise values available for focus adjustment cannot be changed continuously though the amount of focus adjustment can be varied. In addition, there is a limit to the reduction in thickness of the adjustment shim and there is a limit to the improvement in precision of the thickness of the adjustment shim, and accordingly, it is difficult to define fine adjustment settings. Therefore, there has been a conventional problem of it being extremely difficult to finely and continuously adjust the lens position with no positional error in each of the focus adjustment operation and the zoom adjustment operation that are usually carried out in the manufacturing process.

SUMMARY OF THE INVENTION

The present invention provides a lens position adjusting device which makes it possible to finely and continuously adjust the position of a lens group in an optical axis direction relative to the rotation position of a manual rotating ring.

According to an aspect of the present invention, a lens position adjusting device of a lens barrel is provided, including a stationary ring, and a manual rotating ring which is screw-engaged with the stationary ring to be manually rotatable about an optical axis to move a movable lens group in the optical axis direction, wherein the manual rotating ring includes an operating ring member; and a sub-ring member which is screwed into the stationary ring, wherein the operating ring member and the sub-ring member are coupled to each other so that a relative rotation position therebetween about the optical axis is adjustable.

It is desirable for the lens barrel to include a cam ring which rotates integrally with the manual rotating ring about the optical axis and moves integrally with the manual rotating ring in the optical axis direction. The lens group moves in the optical axis direction via a cam device provided in the cam ring as the cam ring rotates while moving in the optical axis direction. The lens position adjusting device includes a relative axial position adjusting device for adjusting a relative position between the manual rotating ring and the cam ring in the optical axis direction.

It is desirable for the relative axial position adjusting device to include at least one adjustment shim which is interposed between the manual rotating ring and the cam ring to adjust a relative position therebetween in the optical axis direction.

It is desirable for at least one circular arc slot to be formed in one of the operating ring member and the sub-ring member, and for the other of the operating ring member and the sub-ring member to be configured so that a rotation position of the other of the operating ring member and the sub-ring member, relative to the one of the operating ring member and the sub-ring member, can be adjusted along the circular arc slot.

It is desirable for the lens position adjusting device to include at least one adjusting screw which passes through the circular arc slot to secure the operating ring member and the sub-ring member to each other. The rotation position of the other of the operating ring member and the sub-ring member relative to the one of the operating ring member and the sub-ring member is adjusted by changing a position of the adjusting screw in the circular arc slot.

It is desirable for a circular length of the circular arc slot about the optical axis to be determined so that a moving distance of the sub-ring member in the optical axis direction when the sub-ring member is rotated by an angle of rotation corresponding to the circular length of the circular arc slot is one of equal to and greater than a thickness of one the adjustment shim.

It is desirable for the manual rotating ring and the movable lens group to serve as a focus ring and a focusing lens group, respectively.

It is desirable for the sub-ring member to include a male screw thread portion formed on an outer peripheral surface thereof, and for the stationary ring to include a female screw thread portion formed on an inner peripheral surface thereof to be engaged with the male screw thread portion.

It is desirable for the sub-ring member to be positioned radially inside of the stationary ring, and for the sub-ring member to be fixed to a rear end of the operating ring member which is positioned radially inside of the stationary ring. A front end of the operating ring member is positioned in front of the stationary ring in the optical axis direction to be exposed radially outwards.

It is desirable for a plurality of the circular arc slots to be formed in the one of the operating ring member and the sub-ring member at substantially equi-angular intervals about the optical axis.

In an embodiment, a lens barrel is provided, including a stationary ring; a manual rotating ring which is screwed into the stationary ring from front thereof to be manually rotatable about an optical axis relative to the stationary ring; and a movable lens group which moves in the optical axis direction as the manual rotating ring is rotated. The manual rotating ring includes an operating ring member, and a sub-ring member positioned immediately behind the operating ring member and screwed into the stationary ring. The operating ring member is engaged with the sub-ring member via an adjusting device so that a rotation position of the operating ring member relative to the sub-ring member can be adjusted using the adjusting device.

It is desirable for the adjusting device to include a plurality of circular arc slots made in one of the operating ring member and the sub-ring member at substantially equi-angular intervals about the optical axis; and a plurality of adjusting screws which pass through the plurality of circular arc slots, respectively, to secure the operating ring member and the sub-ring member to each other. The rotation position of the operating ring member relative to the sub-ring member can be adjusted by rotating the operating ring member and the sub-ring member relative to each other with the plurality of adjusting screws being loosened within a predetermined range of rotation determined by a circular length of each the plurality of circular arc slots about the optical axis.

According to the present invention, since the relative rotation position between the operating ring member and the sub-ring member of the focus ring can be continuously adjusted, the position of the movable lens group in the optical axis direction relative to the rotation position of the manual rotating ring can be continuously adjusted accordingly. Moreover, since the relative position between the manual rotating ring and said cam ring in the optical axis direction can be adjusted using one or more adjustment shims, the position of the movable lens group in the optical axis direction can be adjusted over a wide range. Furthermore, it is possible that the relative rotation position between the operating ring member and the sub-ring member be adjusted via at least one circular arc slot formed in one of the operating ring member and the sub-ring member and at least one corresponding adjusting screw positioned in the circular arc slot. In this case, the position of the movable lens group in the optical axis direction can be continuously adjusted over a wide range if the circular length of the circular arc slot is made to be equal to or greater than the length corresponding to the thickness of one adjustment shim.

The present disclosure relates to subject matter contained in Japanese Patent Application No. 2006-173421 (filed on Jun. 23, 2006), which is expressly incorporated herein in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
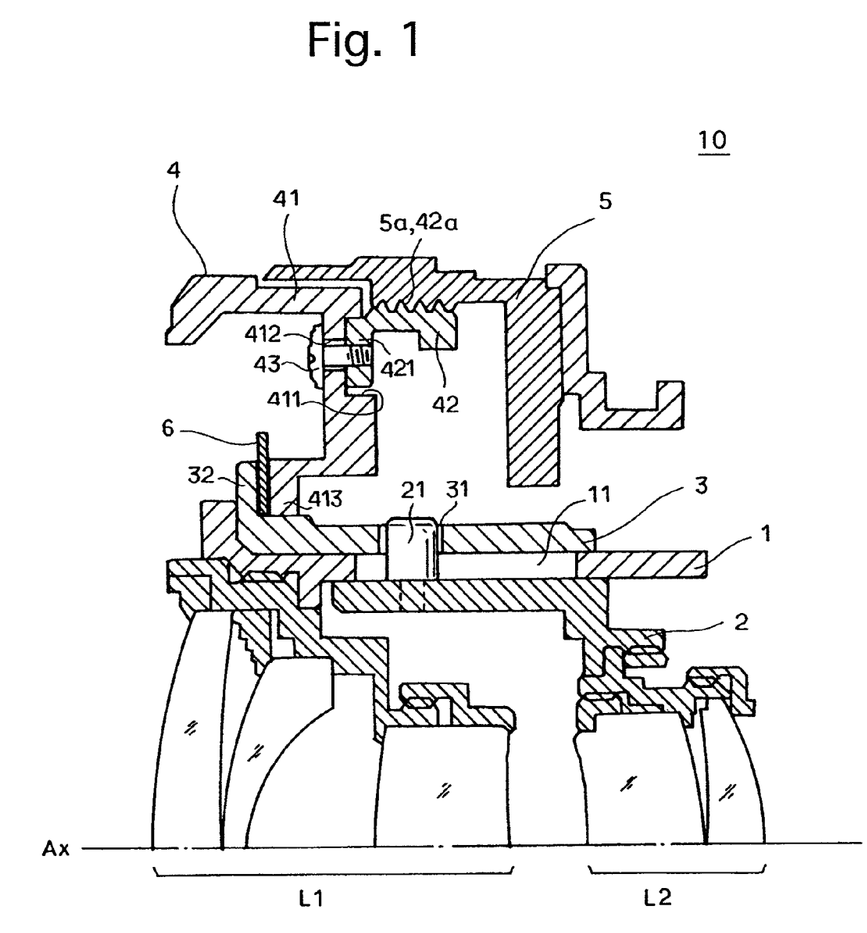
FIG. 1 is a longitudinal cross sectional view of primary elements of an embodiment of a lens barrel which incorporates a lens position adjusting device according to the present invention, showing only an upper half of the lens barrel from the optical axis thereof.
Figure 2:
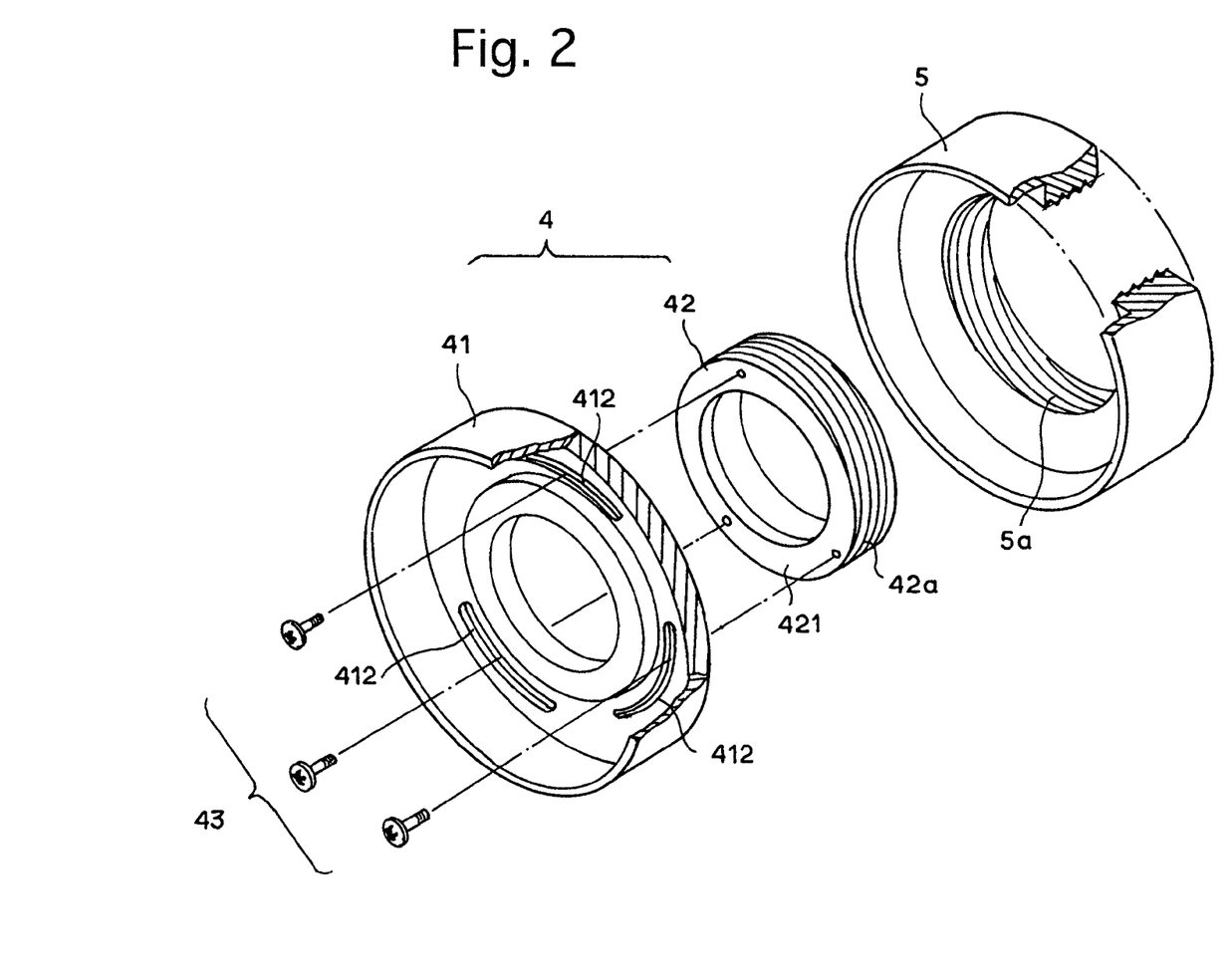
FIG. 2 is an exploded perspective view of several elements shown in FIG. 1, schematically showing the structures thereof.

FIG. 1 is a longitudinal cross sectional view of primary elements of an embodiment of a lens barrel 10 which includes a focusing mechanism to which the present invention is applied, and FIG. 2 is an exploded perspective view of several elements shown in FIG. 1, showing the schematic structures thereof. The lens barrel 10 is provided therein with a stationary barrel 1. The lens barrel 10 is provided, inside of the stationary barrel 1 at the front thereof, with a fixed lens group L1. The lens barrel 10 is provided, inside of the stationary barrel 1, with a lens support frame 2 which is movable along an optical axis Ax, i.e., in the optical axis direction. The lens support frame 2 supports a movable lens group L2. The movable lens group L2 serves as a focusing lens group which is moved in the optical axis direction to carry out a focusing operation. Although each of the fixed lens group L1 and the movable lens group L2 is a lens group consisting of more than one lens element in the illustrated embodiment of the lens barrel, each of the fixed lens group L1 and the movable lens group L2 can consist of a single lens element. The lens barrel 10 is provided therein with a cylindrical focus cam ring 3 that is fitted on the stationary barrel 1 to be rotatable relative to the stationary barrel 1 about the optical axis Ax. The lens barrel 10 is provided, at the front end thereof around the focus cam ring 3, with a focus ring (manual operating ring/manual rotating ring) 4 which is positioned in an outermost region of the lens barrel 1 to be manually operated. The focus cam ring 3 is joined to the focus ring 4 to be integral therewith. The focus cam ring 3 is provided with a plurality of cam slots 31 (only one of them is shown in FIG. 1) in which a plurality of cam rollers (cam followers; only one of them is shown in FIG. 1) 21 which project radially outwards from the lens support frame 2 are engaged through a plurality of linear guide slots 11 (only one of them is shown in FIG. 1) formed in the stationary barrel 1, respectively. In this cam mechanism, a rotation of the focus cam ring 3 about the optical axis Ax causes the lens support frame 2 (the movable lens barrel L2 that is supported by the support frame 2) to move in the optical axis direction according to the camming action between the cam slots 31 and the cam rollers 21, so that a focusing operation of the lens barrel 10 occurs.

The focus ring 4 is screwed into an outermost stationary ring 5 that is positioned in an outermost region of the lens barrel 1 immediately behind the focus ring 4. The focus ring 4 is composed of two parts: an operating ring member 41 that is manually operated directly by the user, and an a sub-ring member 42 which is secured to the operating ring member 41 to be positioned immediately behind the operating ring member 41. Although the operating ring member 41 and the outermost stationary ring 5 are positioned at substantially the same position in radial directions (at substantially the same height from the optical axis Ax as viewed in FIG. 1), the sub-ring member 42 is formed to be smaller in diameter than the operating ring member 41 to be positioned radially inside of the outermost stationary ring 5. The sub-ring member 42 is provided on an outer peripheral surface thereof with a male thread portion (fine-thread portion) 42a, and the outermost stationary ring 5 is provided on an inner peripheral surface thereof with a female thread portion (fine-thread portion) 5a which is engaged with the male thread portion 42a. The operating ring member 41 and the sub-ring member 42 are fixed to each other at three different positions in a circumferential direction about the optical axis Ax by three adjusting screws 43 as shown in a front elevational view of the focus ring 4 in FIG. 3, viewed from the front thereof in the optical axis direction. More specifically, the operating ring member 41 is provided at a rear end surface thereof with an annular groove (annular recess) 411 about the optical axis Ax and is formed so as to be recessed forward (leftward as viewed in FIG. 1). The sub-ring member 42 is provided at the front end thereof with an annular inward ring flange 421 which is slidably engaged in the annular groove 411. Specifically, the annular groove 411 and the ring flange 421 are engaged with each other to be slidable on each other about the optical axis Ax. The operating ring member 41 is provided, immediately in front of the annular groove 411 along a common circle about the optical axis Ax, with three circular arc slots 412 which are formed as through-holes extending in the direction of the wall thickness of an annular portion of the operating ring member 41 (i.e., in optical axis direction). Each of the three circular arc slots 412 has a required circular length about the optical axis Ax. The three circular arc slots 412 are made at substantially equal-angular intervals about the optical axis Ax. The three adjusting screws 43 are inserted into the three circular arc slots 412 to pass therethrough from the front of the operating ring member 41 in the optical axis direction to be screwed into the ring flange 421 of the sub-ring member 42. The operating ring member 41 and the sub-ring member 42 are integrally coupled to each other by the three adjusting screws 43 with the three circular arc slots 412 being sandwiched between the heads of the three adjusting screws 43 and the ring flange 421 in the optical axis direction. Therefore, in this coupling structure, the three adjusting screws 43 are allowed to move within the three circular arc slots 412, respectively, in a circumferential direction about the optical axis Ax if the three adjusting screws 43 are loosened, which allows the operating ring member 41 and the sub-ring member 42 to rotate relative to each other about the optical axis Ax within the range of circular length of each circular arc slot 412, thus allowing the relative rotation position between the operating ring member 41 and the sub-ring member 42 to be adjusted.

In the focusing mechanism that includes the focus ring 4, rotating the focus ring 4 causes the operating ring member 41 thereof to rotate with the sub-ring member 42 about the optical axis Ax. This rotation of the sub-ring member 42 causes the focus ring 4, which is integral with the sub-ring member 42 by the three adjusting screws 43, to move in the optical axis direction by a small amount of movement relative to the outermost stationary ring 5 due to the engagement of the female thread portion 5a with the male thread portion 42a. Although it has been discussed above that this rotation of the focus ring 4 causes the focus cam ring 3 to rotate, and this rotation of the focus cam ring 3 causes the movable lens group L2 to move in the optical axis direction, the focus ring 4 rotates while moving in the optical axis direction, and therefore, the shapes (cam diagrams) of the plurality of cam slots 31 of the focus cam ring 3 are designed in consideration of this movement of the focus ring 4 in the optical axis direction.

The focus cam ring 3 is provided at the front end thereof in the optical axis direction with an outer flange 32 which projects radially outwards, and the operating ring member 41 of the focus ring 4 is provided at the front end thereof in the optical axis direction with an inner flange 413 which is secured to the outer flange 32 of the focus cam ring 3 to be integral therewith by connecting screws (not shown) with at least one adjustment shim (relative axial position adjusting device) 6 being sandwiched between the inner flange 413 and the outer flange 32. Each adjustment shim 6 is formed as an annular member having the same predetermined thicknesses, and more than one adjustment shim 6 is prepared in advance. Increasing or decreasing the number of adjustment shims 6 interposed between the inner flange 413 and the outer flange 32 makes it possible to separate the focus cam ring 3 and the focus ring 4 from each other in the optical axis direction by the distance corresponding to the total thickness of the adjustment shims 6 interposed between the inner flange 413 and the outer flange 32. With this configuration, it becomes possible to adjust the position of the focus cam ring 3 (which follows a movement of the focus ring 4 when the position of the focus ring 4 relative to the outer stationary ring 5 in the optical axis direction is adjusted by rotating the focus ring 4) in the optical axis direction by an amount corresponding to the total thickness of the adjustment shims 6, which in turn makes it possible to adjust the position of the lens support frame 2 (which is moved for performing a focusing operation) in the optical axis direction, i.e., the position of the movable lens group L2 in the optical axis direction.

Figure 4:
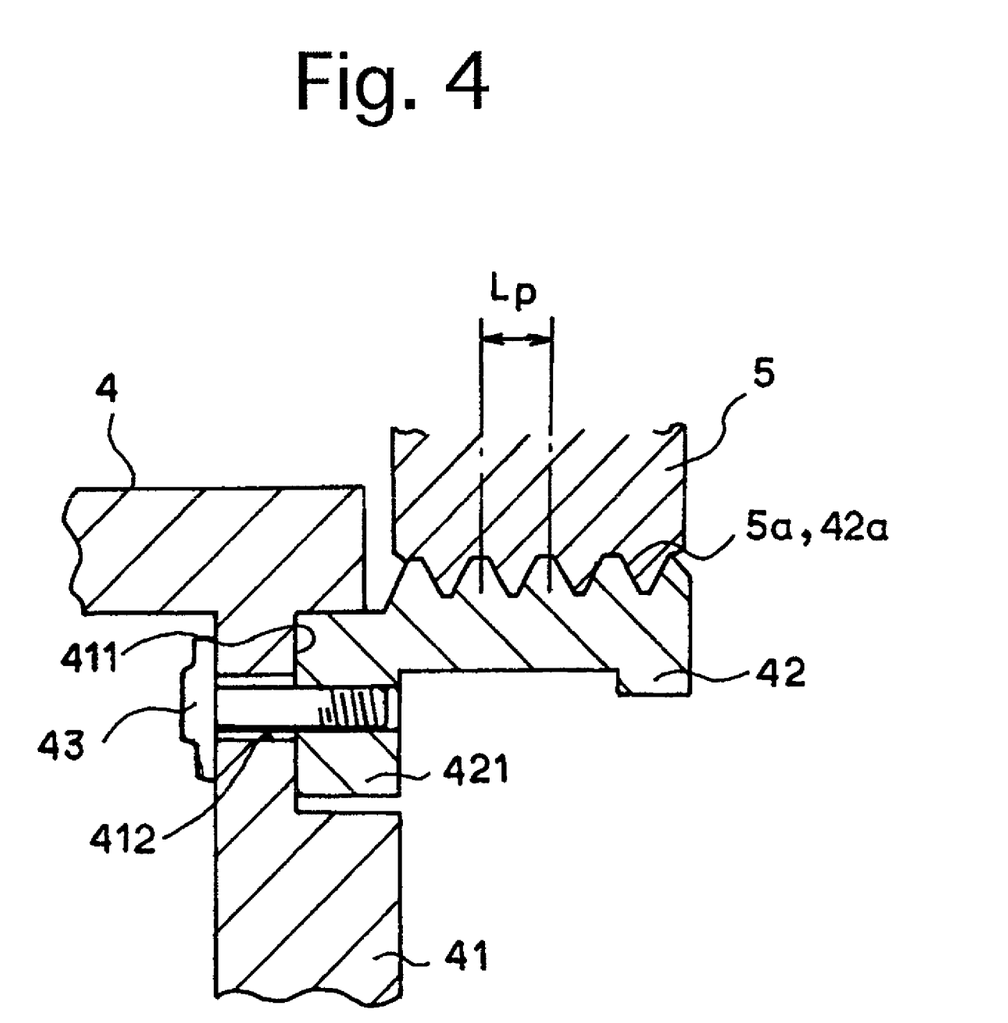
FIG. 4 is an enlarged cross sectional view of a portion of the lens barrel shown in FIG. 1.

According to the above described embodiment of the lens barrel, manually rotating the focus ring 4 causes the operating ring member 41 to rotate, thus causing the sub-ring member 42 that is secured to the operating ring member 41 to rotate integrally therewith. As the sub-ring member 42 rotates, the sub-ring member 42 moves in the optical axis direction in accordance with a pitch Lp of the female thread portion 5a and the male thread portion 42a by an amount of displacement corresponding to the amount of the rotation of the sub-ring member 42 as shown in FIG. 4 since the sub-ring member 42 is screw-engaged with the outermost stationary ring 5 via the engagement of the male thread portion 42a with the female thread portion 5a. This movement of the sub-ring member 42 in the optical axis direction causes the operating ring member 41 (i.e., the focus ring 4) to move with the sub-ring member 42 in the optical axis direction. The rotation of the operating ring member 41 about the optical axis Ax and the movement of the operating ring member 41 in the optical axis direction cause the focus cam ring 3 to rotate with the operating ring member 41 while moving with the same in the optical axis direction. Due to this rotation of the focus cam ring 3 about the optical axis AX and this movement of the focus cam ring 3 in the optical axis direction, the plurality of cam rollers 21 that are respectively engaged in the plurality of cam slots 31 move in the optical axis direction, so that lens support frame 2, i.e., the movable lens group L2 moves in the optical axis direction. Consequently, the movable lens group L2 moves to a position in the optical axis direction which corresponds to the rotation position of the focus ring 4.

Thereupon, if the position of the movable lens group L2 in the optical axis direction is not properly adjusted to correspond to the rotation position of the focus ring 4, a positional error occurs in an actual focus position even if the focus ring 4 is turned to corresponding one of a plurality of markings of the distance scale (not shown) formed on the outermost stationary ring 5. To correct this positional error, as a focus adjustment operation, the number of adjustment shims 6 that are interposed between the focus ring 4 and the focus cam ring 3 is changed, i.e., is increased or decreased. The distance between the focus ring 4 and the focus cam ring 3 in the optical axis direction increases and decreases by reducing and increasing the number of adjustment shims 6 interposed therebetween, respectively. By making this adjustment using one or more adjustment shims 6, the position of the focus cam ring 3 in the optical axis direction can be changed even if the focus ring 4 is set at the same rotation position thereof, which makes it possible to make an adjustment (focus adjustment) to the position of the movable lens group L2 in the optical axis direction with respect to the rotation position of the focus ring 4 with one or more adjustment shims 6.

Figure 5:
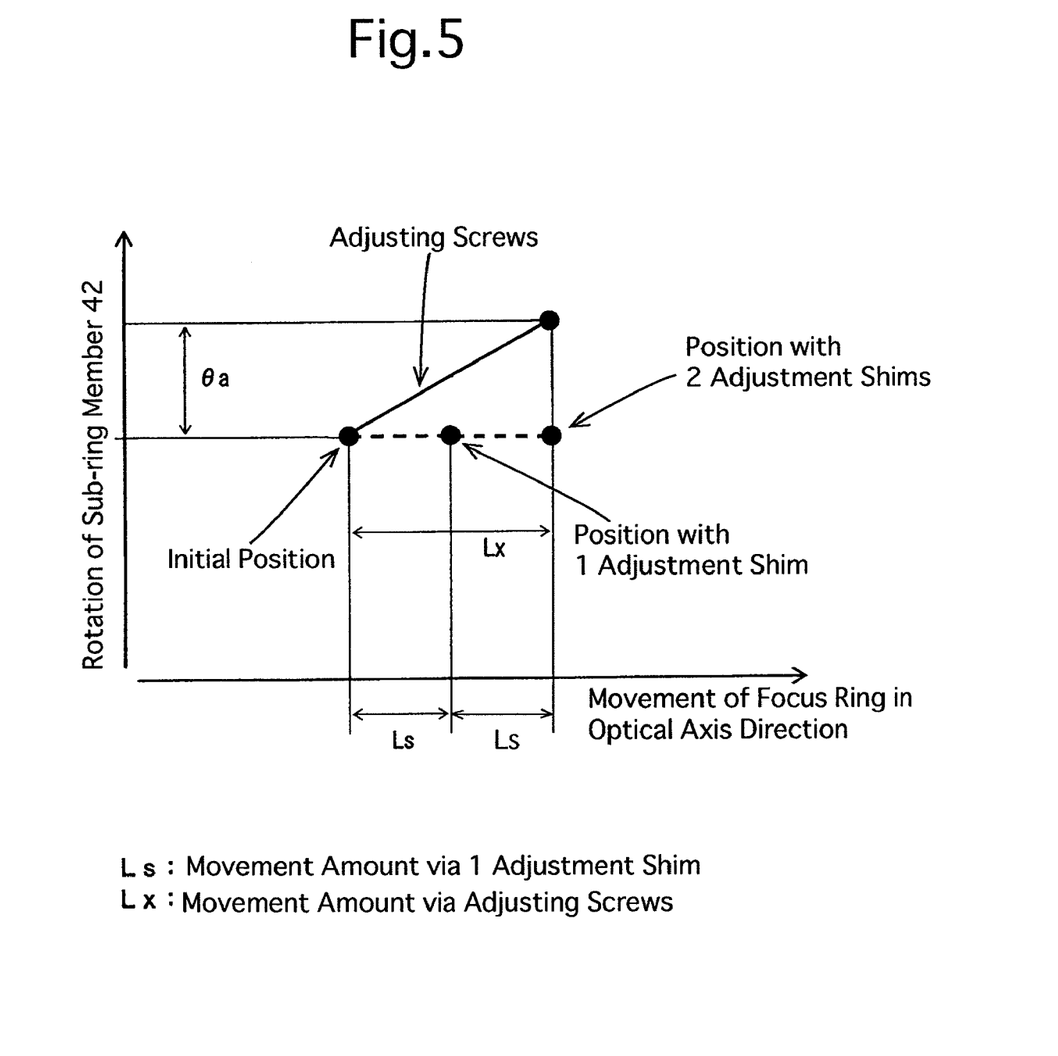
FIG. 5 is a graph illustrating a characteristic of a focus adjustment made with one or more adjustment shims and a characteristic of a focus adjustment made with adjusting screws engaged in circular arc slots.

However, in the focus adjustment using adjustment shims 6, a unit length available for focus adjustment corresponds to the thickness of one adjustment shim 6, so that the focus adjustment using adjustment shims 6 is carried out in a stepwise manner by the unit length Ls (thickness of one adjustment shim 6) as shown by a dotted line in FIG. 5, not a continuous manner. Therefore, making a fine adjustment smaller than the unit length Ls to the position of the movable lens group L2 in the optical axis direction using adjustment shims 6 is impossible. To overcome this problem, in the present embodiment of the lens barrel, an adjustment (fine adjustment) is made to an engaging portion between the operating ring member 41 and the sub-ring member 42 to enhance the accuracy of the focus adjustment. Specifically, the operating ring member 41 and the sub-ring member 42 are brought into a state where each adjusting screw 43 is allowed to move in the associated circular arc slot 412 in a circumferential direction about the optical axis Ax by loosening the three adjusting screws 43. Subsequently, the sub-ring member 42 is rotated relative to the operating ring member 41 within the range of circular length of each circular arc slot 412 to change the relative rotation position between the operating ring member 41 and the sub-ring member 42. Thereupon, the three adjusting screws 43 are fastened securely to fix the operating ring member 41 and the sub-ring member 42 integrally to each other. Consequently, the optical axis position of the focus cam ring 3 corresponding to the rotational position of the operating ring member 41 has been changed due to the sub-ring member 42 being moved in the optical axis direction relative to the outermost stationary ring 5 via the rotation of the sub-ring member 42, so that even though the operating ring member 41 and the focus cam ring 3 connected thereto are moved in the optical axis direction in accordance with such movement, the rotational position of the operating ring member 41 relative to the outermost stationary ring 5 does not change. Namely, during a focusing operation, the optical axis position of the focus cam ring 3, which corresponds to the rotational position of the operating ring member 41 of the focus ring 4, is changed, thus causing the position of the movable lens group L2 in the optical axis direction to change. In other words, a focus adjustment operation for making the position of the movable lens group L2 in the optical axis direction to properly correspond to the rotation position of the focus ring 4 can be carried out, not only by using one or more adjustment shims 6, but also by relative rotational adjustment of the sub-ring member 42 and the operating ring 41, with the three adjusting screws 43 being loosened.

Figure 3:
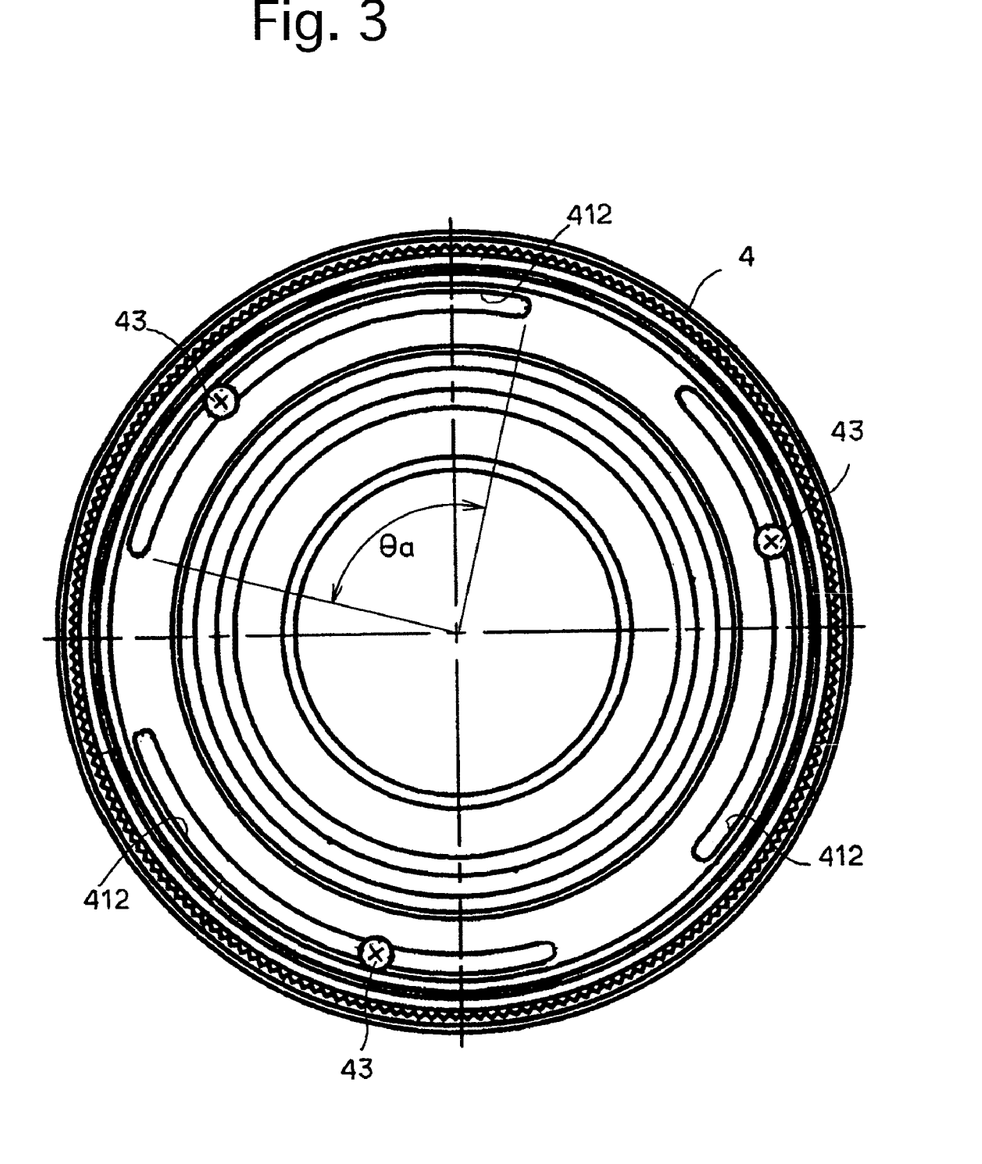
FIG. 3 is a front elevational view of a focus ring of the lens barrel shown in FIG. 1, viewed from the front thereof in the optical axis direction.

Namely, when the rotation position of the sub-ring member 42 relative to the operating ring member 41 is adjusted with the three adjusting screws 43 being loosened, the sub-ring member 42 can be rotated relative to the operating ring member 41 to adjust the rotation position of the sub-ring member 42 relative to the operating ring member 41 within the range of circular length of each circular arc slot 412 that is shown in FIG. 3. As shown in FIG. 5, this adjustable range corresponds to a moving distance Lx of the sub-ring member 42 in the optical axis direction relative to the outermost stationary ring 5 when the sub-ring member 42 rotates relative to the outermost stationary ring 5 by a center angle θa (see FIG. 3) of each circular arc slot 412. The moving distance Lx can be represented by the following equation:

$$Lx = Lp \times (\theta a / 360),$$

wherein θa represents the center angle of each circular arc slot 412; and Lp represents the pitch of the female thread portion 5a and the male thread portion 42a (i.e., the moving distance of the sub-ring member 42 in the optical axis direction when the sub-ring member 42 rotates by one turn (a 360-degree rotation) relative to the outermost stationary ring 5).

Therefore, if the moving distance Lx available for focus adjustment is set to be greater than a unit length Ls (see FIG. 5), the unit length Ls corresponding to the thickness of one adjustment shim 6, it becomes possible to not only carry out an adjustment by an amount equal to the adjustment range of one adjustment shim 6, it is also possible to carry out a fine adjustment smaller than the unit length Ls of the position of the movable lens group L2 in the optical axis direction; moreover, it is possible to change the amount of focus adjustment continuously since the angle of the sub-ring member 42 relative to the operating ring member 41 about the optical axis Ax can be continuously changed. In this particular embodiment of the lens barrel, the moving distance Lx is set to be double the unit length Ls. Therefore, it is possible to make a focus adjustment by rotating the sub-ring member 42 relative to the operating ring member 41 with the three adjusting screws 43 being loosened instead of making a focus adjustment which is made by increasing or reducing the number of adjustment shims 6 by one.

In this manner, since it is possible to adjust the relative rotation position between the sub-ring member 42 and the operating ring member 41 continuously via the three adjusting screws 43 in the above illustrated embodiment of the lens barrel, the rotation position of the focus cam ring 3 relative to the sub-ring member 42 and the position of the focus cam ring 3 in the optical axis direction, corresponding to the rotation position of the operating ring member 41 (focus ring 4) can be continuously adjusted accordingly. Hence, together with the focus adjusting device using one or more adjustment shims 6 so as to adjust the second lens group L2 in a stepwise manner, the position of the second lens group L2 in the optical axis direction can be continuously adjusted with the focus adjusting device composed of the three adjusting screws 43 and the three circular arc slots 412, and consequently, the position of the movable lens group L2, which serves as a focusing lens group, in the optical axis direction corresponding to the rotation position of the focus ring 4 can be continuously precisely adjusted.

In the above illustrated embodiment of the lens barrel, the center angle θa of each circular arc slot 412 (which corresponds to the circular length of each circular arc slot 412) are equal to or greater than a circular length which corresponds to the thickness of one adjustment shim 6, and may be double the circular length corresponding to the thickness of one adjustment shim 6 like the above illustrated embodiment of the lens barrel. The circular length of each circular arc slot 412 may of course be greater or less than double the circular length corresponding to the thickness of one adjustment shim 6. Additionally, the present invention is not limited solely to the particular configuration of the above described embodiment as along as the relative rotation position between the operating ring member 41 and the sub-ring member 42 of the focus ring 4 can be adjusted. For instance, circular arc slots corresponding to the circular arc slots 412 can be formed in the sub-ring member while the adjusting screws 43 can be screwed into the manual operating ring through the circular arc slots made in the sub-ring member.

The lens position adjusting device according to the present invention is not limited solely to the particular focus adjusting device incorporated in the above described embodiment of the lens barrel. For instance, it is possible to apply the present invention to a zoom adjusting device (focal length position adjusting device) for performing a zoom adjustment operation as long as the lens barrel is configured to move a lens group in the optical axis direction as a manual operating ring of the lens barrel is rotated.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens position adjusting device of a lens barrel comprising:
    a stationary ring,
    a manual rotating ring which is screw-engaged with said stationary ring to be manually rotatable about an optical axis to move a movable lens group in said optical axis direction, and
    a cam ring which rotates integrally with said manual rotating ring about said optical axis and moves integrally with said manual rotating ring in said optical axis direction,
    wherein said manual rotating ring includes an operating ring member; and a sub-ring member which is screwed into said stationary ring, wherein said operating ring member and said sub-ring member are coupled to each other so that a relative rotation position therebetween about said optical axis is adjustable,
    wherein said lens group moves in said optical axis direction via a cam device provided in said cam ring as said cam ring rotates while moving in said optical axis direction, and
    wherein said lens position adjusting device comprises a relative axial position adjusting device for adjusting a relative position between said manual rotating ring and said cam ring in said optical axis direction.

2. The lens position adjusting device according to claim 1, wherein said relative axial position adjusting device comprises at least one adjustment shim which is interposed between said manual rotating ring and said cam ring to adjust a relative position therebetween in said optical axis direction.

3. The lens position adjusting device according to claim 1, wherein said manual rotating ring and said movable lens group serve as a focus ring and a focusing lens group, respectively.

4. The lens position adjusting device according to claim 1, wherein said sub-ring member comprises a male screw thread portion formed on an outer peripheral surface thereof, and
    wherein said stationary ring comprises a female screw thread portion formed on an inner peripheral surface thereof to be engaged with said male screw thread portion.

5. The lens position adjusting device according to claim 1, wherein said sub-ring member is positioned radially inside of said stationary ring, and
    wherein said sub-ring member is fixed to a rear end of said operating ring member which is positioned radially inside of said stationary ring, and
    wherein a front end of said operating ring member is positioned in front of said stationary ring in said optical axis direction to be exposed radially outwards.

6. The lens position adjusting device of a lens barrel according to claim 1, wherein said operating ring member and said sub-ring member are coupled to each other by a surface of said operating ring member and a surface of said sub-ring member contacting each other.

7. The lens position adjusting device of a lens barrel according to claim 1, wherein at least one of said operating ring member and said sub-ring member includes a planar annular surface extending in a plane transverse to the optical axis, said annular surface including at least one arcuate slot, at least one adjusting screw extending in a direction parallel to the optical axis, said adjusting screw extending through said arcuate slot to secure said operating ring member and said sub-ring member to each other in a rotationally adjusted position.

8. The lens position adjusting device of a lens barrel according to claim 1, a relative rotation position between said operating ring member and said sub-ring member being adjustably fixed.

9. A lens position adjusting device of a lens barrel comprising:
    a stationary ring, and
    a manual rotating ring which is screw-engaged with said stationary ring to be manually rotatable about an optical axis to move a movable lens group in said optical axis direction,
    wherein said manual rotating ring includes an operating ring member; and a sub-ring member which is screwed into said stationary ring, wherein said operating ring member and said sub-ring member are coupled to each other so that a relative rotation position therebetween about said optical axis is adjustable,
    wherein at least one circular arc slot is formed in one of said operating ring member and said sub-ring member,
    wherein the other of said operating ring member and said sub-ring member is configured so that a rotation position of said other of said operating ring member and said sub-ring member, relative to said one of said operating ring member and said sub-ring member, can be adjusted along said circular arc slot, and
    wherein a plurality of said circular arc slots are formed in said one of said operating ring member and said sub-ring member at substantially equi-angular intervals about said optical axis.

10. The lens position adjusting device according to claim 9, further comprising at least one adjusting screw which passes through said circular arc slot to secure said operating ring member and said sub-ring member to each other, wherein said rotation position of said other of said operating ring member and said sub-ring member relative to said one of said operating ring member and said sub-ring member is adjusted by changing a position of said adjusting screw in said circular arc slot.

11. The lens position adjusting device according to claim 10, wherein a circular length of said circular arc slot about said optical axis is determined so that a moving distance of said sub-ring member in said optical axis direction when said sub-ring member is rotated by an angle of rotation corresponding to said circular length of said circular arc slot is one of equal to and greater than a thickness of an adjustment shim interposed between said manual adjusting ring and a cam ring.

12. A lens barrel comprising:

a stationary ring;

a manual rotating ring which is screwed into said stationary ring from front thereof to be manually rotatable about an optical axis relative to said stationary ring; and a movable lens group which moves in said optical axis direction as said manual rotating ring is rotated, wherein said manual rotating ring includes an operating ring member, and a sub-ring member positioned immediately behind said operating ring member and screwed into said stationary ring, and wherein said operating ring member is engaged with said sub-ring member via an adjusting device so that a rotation position of said operating ring member relative to said sub-ring member can be adjusted using said adjusting device, said adjusting device comprising:

a plurality of circular arc slots provided in one of said operating ring member and said sub-ring member at substantially equi-angular intervals about said optical axis; and a plurality of adjusting screws which pass through said plurality of circular arc slots, respectively, to secure said operating ring member and said sub-ring member to each other, wherein said rotation position of said operating ring member relative to said sub-ring member can be adjusted by rotating said operating ring member and said sub-ring member relative to each other with said plurality of adjusting screws being loosened within a predetermined range of rotation determined by a circular length of each said plurality of circular arc slots about said optical axis.

13. The lens barrel according to claim 12, wherein a surface of said operating ring member and a surface of said sub-ring member are maintained in contact by said adjusting device.

14. The lens barrel according to claim 12, said adjusting device comprising at least one planar annular surface having an arcuate slot, at least one adjusting screw extending in a direction parallel to the optical axis, said adjusting screw extending through said arcuate slot to secure said operating ring member and said sub-ring member to each other in a rotationally adjusted position.

15. The lens barrel according to claim 12, said adjusting device being configured to adjustably fix a rotation position of said operating ring member relative to said sub-ring member.

16. The lens position adjusting device according to claim 12, wherein said manual rotating ring and said movable lens group serve as a focus ring and a focusing lens group, respectively.

17. The lens position adjusting device according to claim 12, wherein said sub-ring member comprises a male screw thread portion formed on an outer peripheral surface thereof, and wherein said stationary ring comprises a female screw thread portion formed on an inner peripheral surface thereof to be engaged with said male screw thread portion.

* * * * *